UNITED STATES PATENT OFFICE.

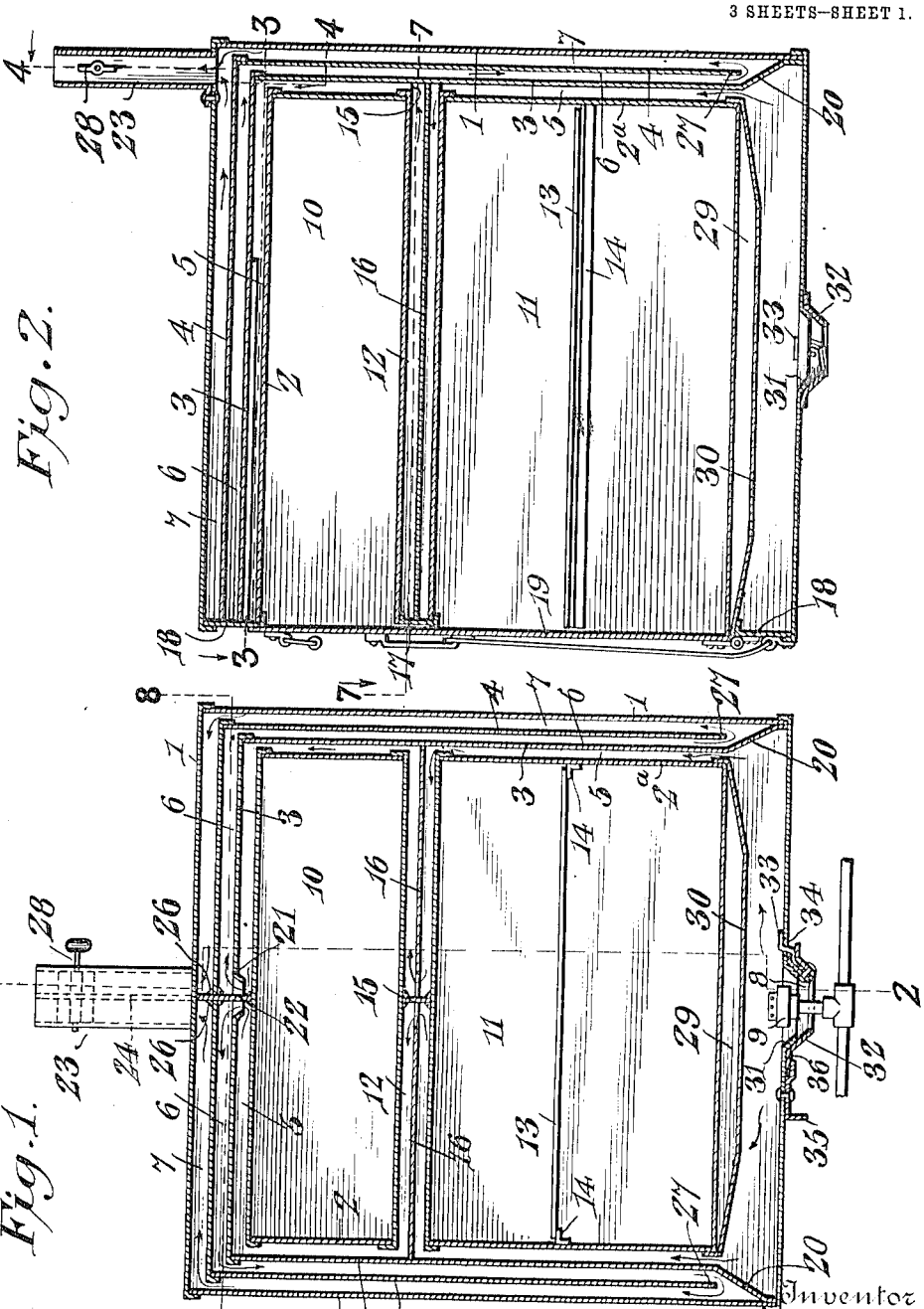

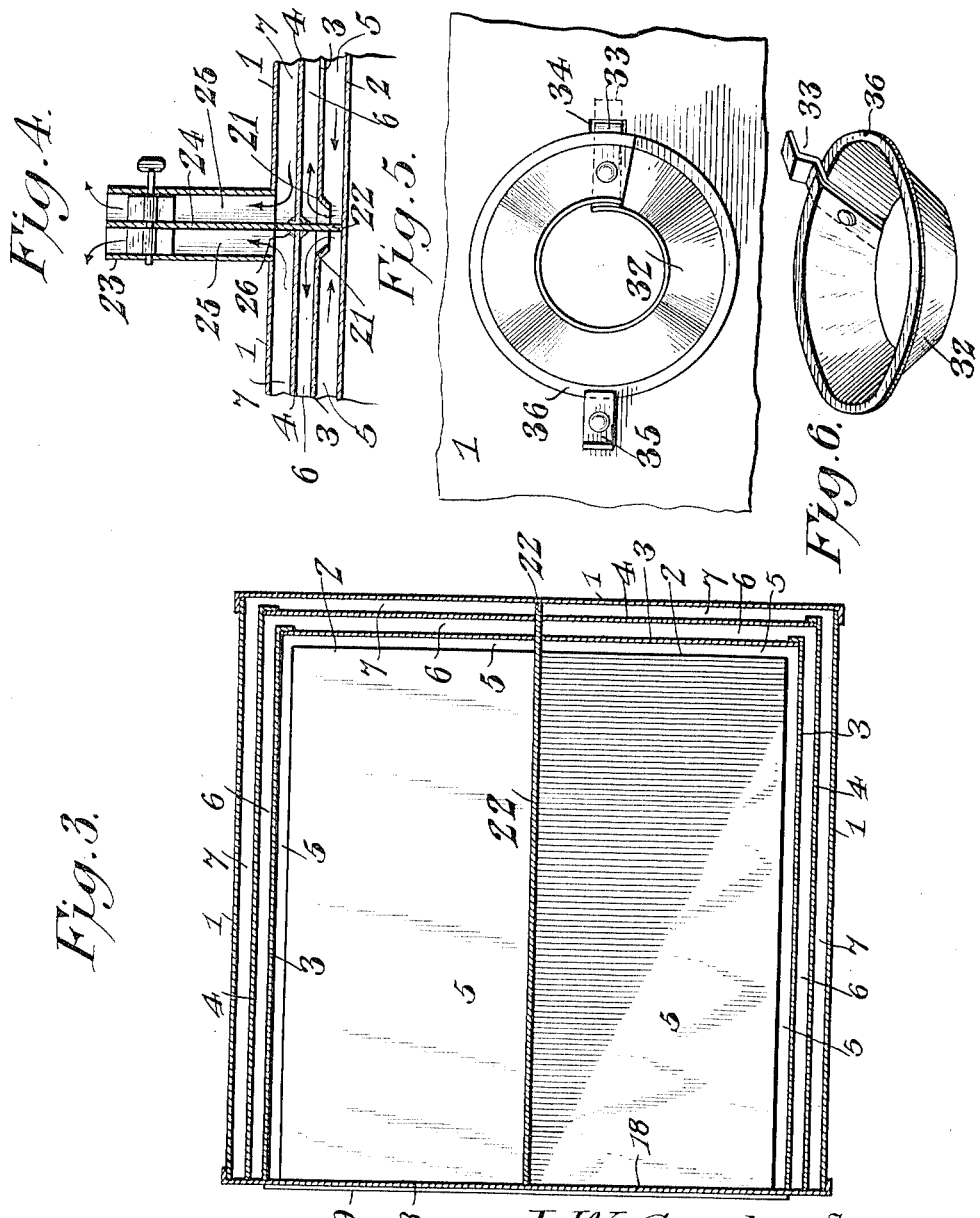

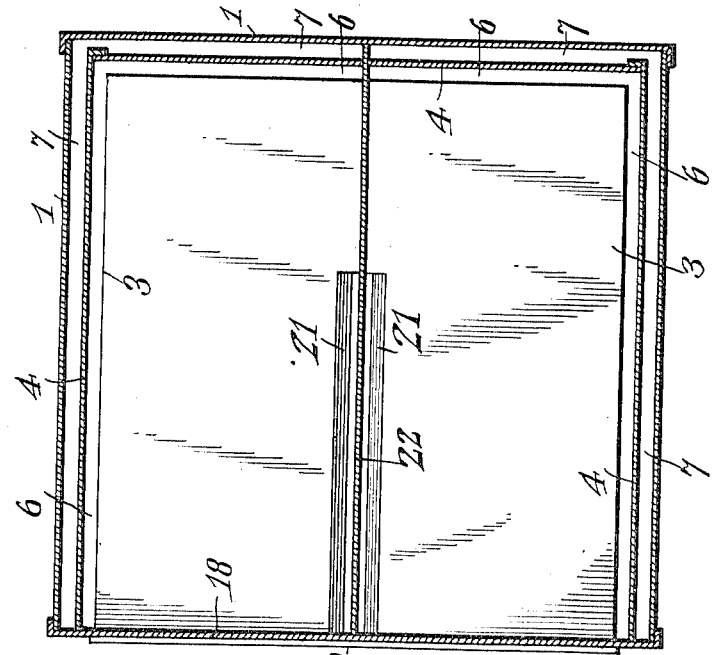
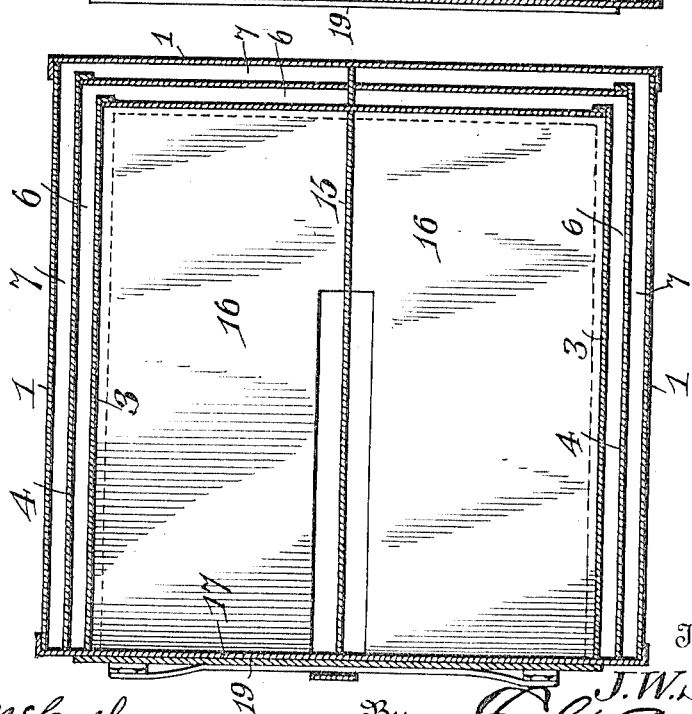

JEFFERSON W. SEALE, OF MINERAL WELLS, TEXAS.

OVEN.

1,040,784. Specification of Letters Patent. Patented Oct. 8, 1912.

Application filed August 1, 1911. Serial No. 641,829.

*To all whom it may concern:*

Be it known that I, JEFFERSON W. SEALE, a citizen of the United States, residing at Mineral Wells, in the county of Palo Pinto and State of Texas, have invented a new and useful Oven, of which the following is a specification.

The invention relates to improvements in ovens.

The object of the present invention is to improve the construction of ovens, and to provide a simple, efficient and comparatively inexpensive oven, capable of obtaining an increased amount of heat from a given quantity of fuel, and adapted to distribute the heat uniformly throughout the oven, thereby insuring perfect baking at the expenditure of a minimum amount of fuel.

A further object of the invention is to provide an oven of this character equipped with means for preventing cold currents of air from striking the burner at the top of the same, whereby smoking of the burner will be prevented and more perfect combustion secured.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a vertical transverse sectional view of an oven, constructed in accordance with this invention. Fig. 2 is a longitudinal sectional view on the line 2—2 of Fig. 1. Fig. 3 is a horizontal sectional view on the line 3—3 of Fig. 2. Fig. 4 is a detail sectional view, taken substantially on the line 4—4 of Fig. 2. Fig. 5 is a detail view of a portion of the bottom of the outer casing, illustrating the arrangement of the tapered depending collar or shield. Fig. 6 is a detail perspective view of the tapered collar or shield. Fig. 7 is a sectional view on the line 7—7 of Fig. 2. Fig. 8 is a sectional view on the line 8—8 of Fig. 1.

Like numerals of reference designate corresponding parts in all the figures of the drawings.

In the accompanying drawings in which is illustrated the preferred embodiment of the invention, the oven comprises in its construction an outer casing 1, upper and lower inner shells 2 2ª and inner and outer interior walls or partitions 3 and 4, located within the space between the outer casing and the inner shells and spaced from the same and from each other, thereby forming three distinct spaces or passages 5, 6 and 7 for the heat or products of combustion. The outer casing 1 is constructed of suitable sheet metal, and it is provided in its bottom with an opening 8 to receive a burner 9, which may be a gasolene burner, a gas burner, or any other suitable heating device, and although a single burner opening is illustrated in the accompanying drawings, yet it will be apparent that any number may be employed to suit the capacity of the oven and to obtain the desired heating effect.

The inner, upper and lower shells 2 and 2ª, which form the innermost wall of the oven, provide upper and lower spaces or compartments 10 and 11 and are separated by a horizontal flue 12 of the same area as the interior of the oven. The flue 12, which is composed of horizontal top and bottom plates or sheets, is adapted to support the cooking utensils, or other articles placed within the upper compartment 10, and the lower compartment 11 is equipped with a shelf or support 13, which is removably arranged upon opposite horizontal supports 14, preferably consisting of strips of angle metal, secured to the inner faces of the opposite sides of the inner shell 2ª and forming horizontal supporting flanges. As the oven may be varied in size any number and arrangement of removable supporting shelves may be employed. The interior of the flue 12 is divided by a central longitudinal vertical partition 15, which also operates to stiffen and brace the flue at the center thereof to prevent the same from collapsing, and to enable the flue to sustain the weight of the cooking utensils without being injured by the same. The horizontal flue 12 enables the heat to pass across the oven centrally of the same, and the spaces within the flue 12 at opposite sides of the partition are divided into separate upper and lower passages by horizontal baffles 16, extending the entire length of the flue 12 and connected at their ends with the front end wall 17 of the flue and the inner interior wall or partition 3 at the back thereof, as clearly illustrated in Fig. 2 of the drawings. The baffles 16 are connected at their outer side edges to the inner interior wall or partition 3, and they extend inwardly therefrom to points close to the central vertical partition 15, but terminate short of the same for the greater portion, say, about two-thirds, of their length to permit the heat and other products of combustion to pass around the inner side edges of the baffles, as indicated by the arrows in Fig. 1 of the drawings, but the heat coming up the back of the oven is directed toward the front for a distance before any of it can pass to the upper side of the baffle, thus concentrating the heat toward the center of the oven. The inner interior wall or partition 3 is composed of side, back and top portions, the interior walls or partitions and the inner shells being united at their front edges to the front wall 18 of the outer casing. The outer casing is provided at the front with a door 19, which communicates with the interior of the oven, and the said front wall 18 extends around the door and around the front of the oven and closes the spaces between the inner shells, the interior walls or partitions and the outer casing at the front of the oven. The inner interior wall or partition 3 is provided below the plane of the bottom of the inner shell 2$^a$ with an inclined portion 20, which is united at the lower edge to the outer casing at the joint between the bottom and the side and rear walls of the same. The inner horizontal edges 21 of the top portions of the inner interior wall or partition 3 terminates short of a central partition 22 for the greater portion, say about two thirds of their length, to provide a communication between the spaces or passages 5 and 6, whereby the heat and products of combustion are caused to pass upward through the inner space or passage 5 and around the said inner edges 21 into the intermediate space 6. The central partition 22 consists of a horizontal top portion and a vertical rear portion, and it extends around the top of the oven from the front wall of the outer casing to the rear wall of the same, and it extends downward at the back of the oven to the bottom of the oven to divide the inner, intermediate and outer passages 5, 6 and 7 equally and completely, so that the heat and products of combustion passing upward at one side of the oven will continue through the passage at that side until they escape at the stove pipe 23. The stove pipe 23 is provided with a central vertical partition 24, which equally divides the draft and forms two separate passages 25, which communicate with the outer passage 7 of each side of the oven. The outer interior wall or partition 4 is connected at the top at 26 to the central partition 22, and its lower edges 27 are spaced from the bottom of the outer casing to provide a communication between the intermediate passage 6 and the outer passage 7, whereby the heat and other products of combustion are caused to pass downward through the intermediate passage 6 and enter the outer passage 7 at the lower end thereof. The heat and products of combustion then pass upward through the outer passage 7 to the top of the oven and across the latter to the stove pipe 23. By this arrangement of the passages, the oven is subjected to a maximum heating effect from a given quantity of fuel, and the inner passage 5 and the intermediate passage 6 are protected from the outside air by the outer passage, thereby enabling the heat of the oven to raise the temperature of the interior of the inner shells to a much higher degree than is possible where an oven is not provided with a similar number of passages. The stove pipe is equipped with a suitable damper 28 by means of which the circulation of the heat through the passages is controlled for slow or rapid baking or cooking.

The lower inner shell 2$^a$ is equipped at the bottom with a dead air space 29 formed by a lower plate or wall 30 and adapted to prevent too intense heat at the bottom of the oven. The bottom of the outer casing is provided at the opening 8 with a depending downwardly tapered annular flange 31, adapted to form a seat for a downwardly tapered annular shield or collar 32, extending below the bottom of the outer casing and beneath the burner a sufficient distance to effectually prevent cold drafts of air from striking the top of the burner or passing over the same, whereby smoking is avoided and more complete combustion secured. The collar or shield is provided at one side with a projecting angular or hook-shaped tongue 33, which projects through a slot or opening 34 in the bottom of the outer casing, and the collar or shield is secured at a point diametrically opposite the tongue by a pivot button 35, which engages an annular flange 36 at the upper edge of the collar or shield. The flange 36, which extends outwardly from the collar or shield at the top thereof, fits against the lower face of the bottom of the outer casing, and the pivot button 35, which is provided at the outer end with a depending handle portion, is angularly bent at the inner portion to engage beneath the flange 36. By this construction the collar or shield is detachably secured to the bottom of the outer casing and may be readily removed to afford access to the burner.

Having thus fully described my invention, what I claim as new and desire to secure by Letters Patent, is:

1. An oven of the class described including an inner shell, an outer casing spaced from the inner shell, a central partition dividing the space between the inner shell and the outer casing into separate side portions, interiorly arranged walls dividing the space at opposite sides of the partition into a plurality of passages, and a stove pipe communicating with the said passages.

2. An oven of the class described including an inner shell, an outer casing spaced from the inner shell, a central partition composed of top and rear portions and dividing the space between the inner shell and the outer casing into separate side portions, interiorly arranged walls located in the space between the inner shell and the outer casing and forming a plurality of passages for causing heat and other products of combustion to pass back and forth from the bottom to the top of the oven, and a stove pipe having separate passages communicating with the passages at opposite sides of the central partition.

3. An oven of the class described including upper and lower inner shells, an outer casing spaced from the said shells, a central partition composed of top, and rear portions and dividing the space between the outer casing and the inner shells into separate side portions, interiorly arranged walls located in said space and forming a plurality of passages for causing the heat and products of combustion to pass back and forth from the bottom to the top of the oven, a stove pipe having separate passages communicating with the said passages at opposite sides of the central partition, said shells being spaced apart to form a horizontal flue having a central partition, and baffle plates located within the said horizontal flue and extending inwardly from the interiorly arranged walls and terminating at points short of the central partition of the horizontal flue and dividing the said horizontal flue into upper and lower passages, which are connected with some of the first-mentioned passages.

4. An oven of the class described provided at the bottom with a burner opening and having a downwardly tapered annular flange depending from the opening, and a downwardly tapered annular shield or collar fitted against the said flange and detachably secured to the oven and arranged to extend inwardly beneath a burner to prevent cold draft from striking the top or passing over the same.

5. An oven of the class described provided in its bottom with a burner opening and provided at one side of the opening with a slot, a shield depending from the bottom of the oven at the opening and provided at the top with a flange fitting against the said bottom, a tongue extending from one side of the shield and projecting into the said slot, and a fastening device mounted on the bottom of the oven and engaging the flange of the shield at a point opposite the tongue for detachably securing the shield to the oven.

In testimony, that I claim the foregoing as my own, I have hereto affixed my signature in the presence of two witnesses.

JEFFERSON W. SEALE.

Witnesses:
J. W. BEASLY,
C. D. INGRAM.